United States Patent [19]
Lynch

[11] Patent Number: 5,649,126
[45] Date of Patent: Jul. 15, 1997

[54] PARALLEL SIGNAL BUS WITH REDUCED MILLER EFFECT CAPACITANCE

[75] Inventor: William L. Lynch, Palo Alto, Calif.

[73] Assignee: Sun Microsystems, Inc., Mountain View, Calif.

[21] Appl. No.: 566,842

[22] Filed: Dec. 4, 1995

[51] Int. Cl.⁶ .................................................. G06F 13/40
[52] U.S. Cl. ................................................................ 395/306
[58] Field of Search .................................... 395/306, 309, 395/280, 800; 364/490, 491; 365/63; 333/32; 324/679; 326/30

[56] References Cited

U.S. PATENT DOCUMENTS

| | | | |
|---|---|---|---|
| 4,095,198 | 6/1978 | Kirby | 333/32 |
| 4,599,486 | 7/1986 | Herrandez | 174/72 B |
| 4,975,874 | 12/1990 | Childers et al. | 365/63 |
| 5,233,220 | 8/1993 | Lamson et al. | 257/666 |
| 5,301,349 | 4/1994 | Nakata et al. | 395/800 |
| 5,432,127 | 7/1995 | Lamson et al. | 437/182 |
| 5,465,058 | 11/1995 | Krenik et al. | 326/83 |
| 5,467,456 | 11/1995 | Moxley et al. | 364/490 |

OTHER PUBLICATIONS

Tsutomu Yoshihara, Hideto Hidaka, Yoshio Matsuda and Kazuyasu Fujishima, "A Twisted Bit Line Technique for Multi-Mb DRAMs", IEEE International Solid-State Circuits Conference, Feb. 19, 1988, pp. 238 and 239.

*Primary Examiner*—Gopal C. Ray
*Attorney, Agent, or Firm*—Limbach & Limbach L.L.P.

[57] ABSTRACT

A parallel signal bus for conveying a plurality of logic signals with reduced Miller effect capacitance includes adjacent, parallel signal lines with inverting buffer amplifiers whose respective positions are staggered both longitudinally along the signal lines and latitudinally with respect to their adjacent signal lines. With such a staggered configuration, the resulting Miller effect capacitance which would otherwise result from adjacent signal lines being driven at opposing polarities is reduced, on average, by approximately half.

15 Claims, 2 Drawing Sheets

PARALLEL SIGNAL BUS WITH REDUCED MILLER EFFECT CAPACITANCE

BACKGROUND OF THE INVENTION

1. Field of the Invention

The present invention relates to parallel signal buses, and in particular, parallel signal buses having parallel signal lines with sufficiently close line spacings such as to introduce Miller effect capacitances between adjacent signal lines.

2. Description of the Related Art

As digital integrated circuits become more complex and operate at increasingly higher clock rates, the geometries of such devices have become significantly smaller. As a result, signal lines (e.g. in the form of metalization layer segments) are located more closely to one another, i.e. the distance between adjacent signal lines has become significantly smaller.

As such distances become smaller, the effective capacitances between such signal lines increase and, therefore, become of greater concern. Where the relative polarities of the signals on two adjacent signal lines are in opposition to one another, i.e. with signal transitions occurring in opposite directions and/or signal levels of opposite polarities or different magnitudes, the effective capacitance between such signal lines is increased due to the well known "Miller effect." In other words, as is well known in the art, the effective capacitance of the adjacent signal lines is increased by the so-called Miller effect when the magnitudes of the signals move in opposite directions. Such increases in effective capacitance cause the effective transmission rate of the signals on such lines to decrease due to the charging and discharging of the Miller effect capacitance.

One technique which may be used to reduce the Miller effect capacitance between adjacent signal lines is to simply increase the spacing between such signal lines. Another technique is to insert other lines between the active signal lines, e.g. insert power supply lines or significantly less active signal lines between those signal lines which tend to be the most active. However, both of these techniques have the disadvantage of reducing the density of the parallel signal bus. This disadvantage is increasingly troublesome as densities of parallel signal buses increase, e.g. as in the case of 16-bit and 32-bit address and/or data buses in the newer microprocessors.

Accordingly, it would be desirable to have an improve topography for a parallel signal bus which minimizes Miller effect capacitances between adjacent signal lines while simultaneously maximizing the density of the signal bus.

SUMMARY OF THE INVENTION

A parallel signal bus with reduced Miller effect capacitance in accordance with the present invention minimizes Miller effect capacitances between adjacent signal lines while simultaneously maximizing the density of the signal bus. The Miller effect capacitances are minimized without increasing the relative spacing or introducing other signal lines between the parallel signal bus lines. A parallel signal bus for conveying multiple logic signals with reduced Miller effect capacitance includes two sets of logic signal paths. Each one of the logic signal paths in the first set includes a first conductor having a first conductor length. Individual ones of the logic signal paths of both sets are adjacent and substantially parallel to one another, and each one of the logic signal paths in the second set includes a second conductor having a second conductor length, a logic inverter having an input terminal connected to an end of the second conductor and having an output terminal, and a third conductor having a third conductor length and one end connected to the logic inverter output terminal. The second and third conductor lengths are approximately equal to one another and a sum of the second and third conductor lengths is approximately equal to the first conductor length.

These and other features and advantages of the present invention will be understood upon consideration of the following detailed description of the invention and the accompanying drawings.

DETAILED DESCRIPTION OF THE INVENTION

Figure 1:
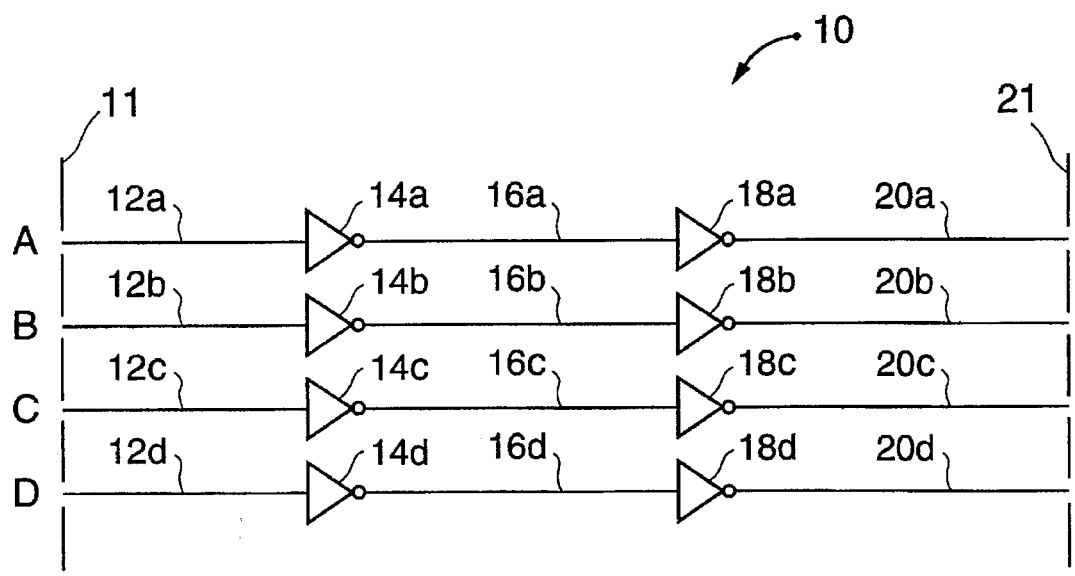
FIG. 1 is a schematic diagram of a conventional parallel signal bus with inverting buffer amplifiers.

Referring to FIG. 1, a conventional parallel signal bus 10 with inverting buffering amplifiers 14, 18 can be depicted as shown. Starting at a source 11 of parallel signals (e.g. a parallel data or address output), the parallel signal lines A, B, C, D have initial line segments 12a–12d which terminate at the input port of inverting buffering amplifiers 14a–14d. The outputs of these buffer amplifiers 14a–14d drive intermediate signal line segments 16a–16d which terminate at the inputs to additional inverting buffer amplifiers 18a–18d. In turn, these buffer amplifiers 18a–18d drive final signal line segments 20a–20d which terminate at a destination 21 for the signals being conveyed by these signal lines A, B, C, D (e.g. a parallel data or address input).

When adjacent signal lines (e.g. lines A and B, lines B and C, or lines C and D) are driven by signals having magnitudes which swing in opposite directions, the Miller effect causes the effective capacitance between such adjacent signal lines to become effectively doubled. Therefore, due to the time required for the charging and discharging of such inter-line capacitances, the propagation rate of the signals being conveyed is reduced and the group delay characteristic becomes distorted. As result, overall circuit or system operation becomes slower. Such effects on signal propagation must be taken into account and, as necessary, compensated, elsewhere within the circuit or system.

Figure 2:
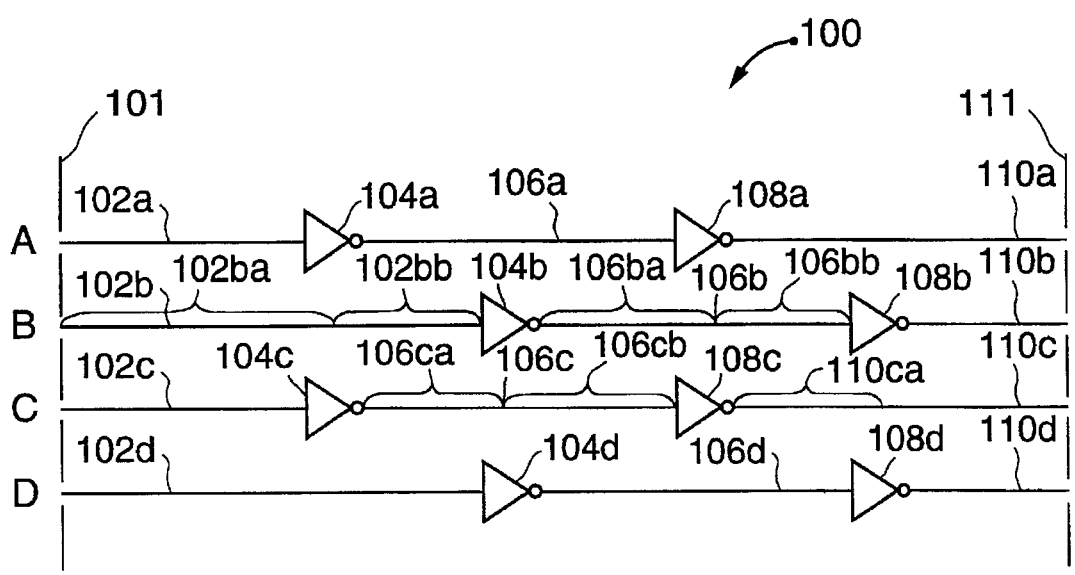
FIG. 2 is a schematic diagram of a parallel signal bus with inverting buffer amplifiers in accordance with one embodiment of the present invention.

Referring to FIG. 2, a parallel signal bus 100 in accordance with one embodiment of the present invention also includes inverting buffer amplifiers 104, 108. However, the relative placements of the corresponding adjacent buffer amplifiers 104, 108 are staggered, or alternating, with respect to one another. For example, along adjacent signal lines B and C, corresponding buffer amplifiers 104b and 104c are staggered longitudinally. The initial signal line segment 102b for signal line B is approximately twice as long as the initial segment 102c for signal line C. In other words, the initial signal line segment 102c of signal line C is approximately equal in length to that of the first half 102ba of the initial segment 102b of signal line B. Accordingly, the second half 102bb of the initial segment 102b of signal line B is approximately equal in length to that of the first half 106ca of the intermediate signal line segment 106c of signal line C. (These relative line lengths, while not always exact depending upon the precise placements of the various buffer amplifiers 104, 108, are nonetheless very close approximations due to the fact that the circuitry for each of the inverting buffer amplifiers 104, 108 is quite short in length as compared to the initial, intermediate and final line segments of the signal lines A, B, C, D.) These relative line lengths of the various segments of the signal lines A, B, C, D are consistent between the source 101 and destination 111 of the signals being conveyed. Hence, the inverting buffer amplifiers 104, 108 are staggered both longitudinally along each signal line A, B, C, D and latitudinally with respect to adjacent signal lines.

With such staggered buffer amplifiers 104, 108, the resulting reductions in the Miller effect capacitances between the signal lines A, B, C, D can be better understood by considering the following example. When the logic signals on signal lines B and C have amplitudes which swing in opposite directions, the magnitudes on adjacent line segments 102ba and 102c are opposite in polarity (or at least different in magnitude) from one another. However, due to the presence of the inverting buffer amplifier 104c, the magnitudes on lines segments 102bb and 106ca are equal and, therefore, of the same polarity. Accordingly, the effective capacitance, due to the Miller effect, between line segments 102ba and 102c is doubled; however, the effective capacitance between subsequent line segments 102bb and 106ca is effectively zero since the signal magnitudes are equal along such segments 102bb, 106ca. Hence, the average capacitance is (2C+0C)/2=1C (where C is the effective capacitance between adjacent signal lines) and not the worst case 2C which would otherwise result from the Miller effect.

Advantageously, this minimizing of the Miller effect capacitances is not dependent upon the actual individual data values conveyed by the signal lines A, B, C, D, since each signal line segment is half the length of its adjacent corresponding signal line segment, and while half of the corresponding adjacent signal line segments swing in opposite directions, the other half swing in similar directions.

Figure 3:
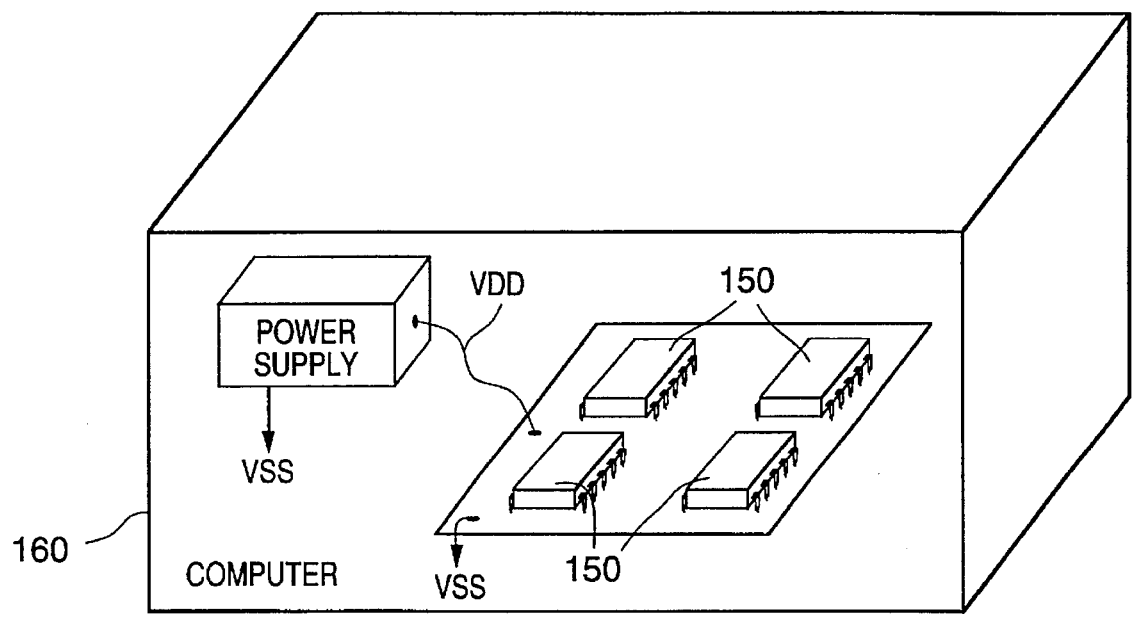
FIG. 3 represents the integration of a parallel signal bus in accordance with the present invention within an integrated circuit and the incorporation thereof within a computer.

Referring to FIG. 3, a parallel signal bus with reduced Miller effect capacitance in accordance with the present invention can be used perhaps most advantageously when integrated within an integrated circuit (IC) 150. In accordance with the foregoing discussion, the IC 50 can be designed to have a number of such parallel signal buses integrated therein so as to take maximum advantage of the speed-enhancing and power-saving benefits which can be realized with reduced Miller effect capacitances. For example, by incorporating a number of such ICs 150 into a computer 160, maximum system speed can be achieved without increasing the system power requirements.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a parallel signal bus for conveying a plurality of logic signals with reduced Miller effect capacitance, said parallel signal bus comprising:

a first plurality of logic signal paths each one of which includes a first conductor having a first conductor length; and a second plurality of logic signal paths, wherein individual ones of said first and second pluralities of logic signal paths are adjacent and substantially parallel to one another, and wherein each one of said second plurality of logic signal paths includes:
 a second conductor having a second conductor length,
 a first logic inverter having an input terminal connected to an end of said second conductor and having an output terminal, and
 a third conductor having a third conductor length and one end connected to said first logic inverter output terminal,
wherein said second and third conductor lengths are approximately equal to one another and a sum of said second and third conductor lengths is approximately equal to said first conductor length.

2. The apparatus of claim 1, wherein a first portion approximately one-half of said first conductor length is adjacent to said second conductor length and a second portion approximately one-half of said first conductor length is adjacent to said third conductor length.

3. The apparatus of claim 1, wherein:

each one of said first plurality of logic signal paths further includes:
 a second logic inverter having an input terminal connected to an end of said first conductor and having an output terminal, and
 a fourth conductor having a fourth conductor length and one end connected to said second logic inverter output terminal; and each one of said second plurality of logic signal paths further includes a fifth conductor having a fifth conductor length and one end connected to another end of said third conductor;

and wherein said third, fourth and fifth conductor lengths are approximately equal to one another.

4. The apparatus of claim 3, wherein a first portion approximately one-half of said first conductor length is adjacent to said second conductor length and a second portion approximately one-half of said first conductor length is adjacent to said third conductor length.

5. The apparatus of claim 4, wherein said fourth conductor length is adjacent to said fifth conductor length.

6. The apparatus of claim 1, further comprising an integrated circuit into which said parallel signal bus is integrated.

7. The apparatus of claim 1, further comprising a computer into which said parallel signal bus is incorporated.

8. A method of providing an apparatus including a parallel signal bus for conveying a plurality of logic signals with reduced Miller effect capacitance, said method comprising the steps of:

providing a first plurality of logic signal paths each one of which includes a first conductor having a first conductor length; and providing a second plurality of logic signal paths, wherein individual ones of said first and second pluralities of logic signal paths are adjacent and substantially parallel to one another, and wherein each one of said second plurality of logic signal paths includes:
 a second conductor having a second conductor length,
 a first logic inverter having an input terminal connected to an end of said second conductor and having an output terminal, and a third conductor having a third conductor length and one end connected to said first logic inverter output terminal, wherein said second and third conductor lengths are approximately equal to one another and a sum of said second and third conductor lengths is approximately equal to said first conductor length.

9. The method of claim 8, wherein:

each one of said first plurality of logic signal paths further includes:
- a second logic inverter having an input terminal connected to an end of said first conductor and having an output terminal, and
- a fourth conductor having a fourth conductor length and one end connected to said second logic inverter output terminal; and each one of said second plurality of logic signal paths further includes a fifth conductor having a fifth conductor length and one end connected to another end of said third conductor;

and wherein said third, fourth and fifth conductor lengths are approximately equal to one another.

10. The method of claim 8, further comprising the step of providing an integrated circuit into which said parallel signal bus is integrated.

11. The method of claim 8, further comprising the step of providing a computer into which said parallel signal bus is incorporated.

12. A method of conveying a plurality of logic signals via a parallel signal bus with reduced Miller effect capacitance, said method comprising the steps of:

conveying a first plurality of logic signals via a first plurality of logic signal paths each one of which includes a first conductor having a first conductor length; and conveying a second plurality of logic signals via a second plurality of logic signal paths, wherein individual ones of said first and second pluralities of logic signals are conveyed adjacent and substantially parallel to one another, and wherein each one of said second plurality of logic signals is conveyed by conducting said each one of said second plurality of logic signals via:
- a second conductor having a second conductor length,
- a first logic inverter having an input terminal connected to an end of said second conductor and having an output terminal, and
- a third conductor having a third conductor length and one end connected to said first logic inverter output terminal, wherein said second and third conductor lengths are approximately equal to one another and a sum of said second and third conductor lengths is approximately equal to said first conductor length.

13. The method of claim 12, wherein:

said step of conveying a first plurality of logic signals via a first plurality of logic signal paths each one of which includes a first conductor having a first conductor length comprises conducting each one of said first plurality of logic signals via:
- a second logic inverter having an input terminal connected to an end of said first conductor and having an output terminal, and
- a fourth conductor having a fourth conductor length and one end connected to said second logic inverter output terminal; and said step of conveying a second plurality of logic signals via a second plurality of logic signal paths further comprises conducting said each one of said second plurality of logic signals via a fifth conductor having a fifth conductor length and one end connected to another end of said third conductor;

and wherein said third, fourth and fifth conductor lengths are approximately equal to one another.

14. The method of claim 12, further comprising the step of performing the recited steps within an integrated circuit.

15. The method of claim 12, further comprising the step of performing the recited steps within a computer.

* * * * *